(12) United States Patent
Cremers et al.

(10) Patent No.: US 7,672,516 B2
(45) Date of Patent: Mar. 2, 2010

(54) STATISTICAL PRIORS FOR COMBINATORIAL OPTIMIZATION: EFFICIENT SOLUTIONS VIA GRAPH CUTS

(75) Inventors: Daniel Cremers, Bonn (DE); Leo Grady, Yardley, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 977 days.

(21) Appl. No.: 11/376,405

(22) Filed: Mar. 15, 2006

(65) Prior Publication Data

US 2007/0022067 A1 Jan. 25, 2007

Related U.S. Application Data

(60) Provisional application No. 60/663,768, filed on Mar. 21, 2005.

(51) Int. Cl.
  *G06K 9/62* (2006.01)
  *G06K 9/40* (2006.01)
(52) U.S. Cl. .................. 382/228; 382/160; 382/275
(58) Field of Classification Search .......... 382/160, 382/228, 275
  See application file for complete search history.

(56) References Cited

U.S. PATENT DOCUMENTS

| 5,394,484 | A * | 2/1995 | Casey et al. ............... 382/159 |
| 6,366,684 | B1 * | 4/2002 | Gerard et al. ............. 382/132 |
| 6,744,923 | B1 * | 6/2004 | Zabih et al. .............. 382/226 |
| 6,973,212 | B2 * | 12/2005 | Boykov et al. ............. 382/173 |
| 7,085,409 | B2 * | 8/2006 | Sawhney et al. ........... 382/154 |
| 7,164,718 | B2 * | 1/2007 | Maziere et al. ........ 375/240.16 |
| 7,400,767 | B2 * | 7/2008 | Slabaugh et al. ........... 382/173 |
| 7,418,139 | B2 * | 8/2008 | Higaki ..................... 382/199 |
| 7,486,820 | B2 * | 2/2009 | Grady ..................... 382/173 |
| 7,609,888 | B2 * | 10/2009 | Sun et al. ................. 382/173 |
| 2002/0037103 | A1 * | 3/2002 | Hong et al. ............... 382/173 |
| 2002/0048401 | A1 * | 4/2002 | Boykov et al. ............. 382/173 |
| 2002/0167515 | A1 * | 11/2002 | Kamen et al. .............. 345/420 |
| 2003/0169812 | A1 * | 9/2003 | Maziere et al. ........ 375/240.08 |
| 2003/0206652 | A1 * | 11/2003 | Nister ..................... 382/154 |
| 2004/0052383 | A1 * | 3/2004 | Acero et al. ............... 381/94.1 |
| 2004/0086873 | A1 * | 5/2004 | Johnson et al. ............. 435/6 |
| 2004/0215425 | A1 * | 10/2004 | Cherkassky ................ 702/189 |
| 2005/0238215 | A1 * | 10/2005 | Jolly et al. ................ 382/128 |
| 2006/0147126 | A1 * | 7/2006 | Grady ..................... 382/274 |

(Continued)

OTHER PUBLICATIONS

Kolmogorov et al. "What Energy Functions Can Be minmized via Graph Cuts?" IEEE Transactions on Pattern Analysis and Machine Intelligence, vol, 26, No. 2, Feb 2004, pp. 147-159.*

(Continued)

*Primary Examiner*—Andrew W Johns
*Assistant Examiner*—Mia M Thomas
(74) *Attorney, Agent, or Firm*—Donald B. Paschburg

(57) ABSTRACT

Methods of statistical learning for Bayesian inference in the context of efficient optimization schemes for image restoration are presented. Second and third order priors that may be learned while maintaining graph representability are identified. A framework to learn and impose prior knowledge on the distribution of pairs and triplets of labels via graph cuts is presented. The disclosed methods optimally restore binary textures from very noisy images with runtimes in the order of seconds while imposing hundreds of statistically learned constraints per node.

20 Claims, 4 Drawing Sheets

U.S. PATENT DOCUMENTS

| | | | |
|---|---|---|---|
| 2006/0158447 A1* | 7/2006 | McGraw et al. | 345/419 |
| 2006/0214932 A1* | 9/2006 | Grady et al. | 345/440 |
| 2006/0217925 A1* | 9/2006 | Taron et al. | 702/179 |
| 2006/0239553 A1* | 10/2006 | Florin et al. | 382/173 |
| 2007/0014457 A1* | 1/2007 | Jolly et al. | 382/128 |
| 2007/0031037 A1* | 2/2007 | Blake et al. | 382/173 |
| 2007/0058884 A1* | 3/2007 | Rother et al. | 382/284 |
| 2007/0086656 A1* | 4/2007 | Higaki | 382/199 |
| 2007/0116381 A1* | 5/2007 | Khamene | 382/276 |
| 2007/0237393 A1* | 10/2007 | Zhang et al. | 382/173 |
| 2008/0031404 A1* | 2/2008 | Khamene et al. | 378/6 |
| 2008/0080775 A1* | 4/2008 | Zabih et al. | 382/226 |
| 2009/0175522 A1* | 7/2009 | Li et al. | 382/130 |
| 2009/0248608 A1* | 10/2009 | Ravikumar et al. | 706/55 |

OTHER PUBLICATIONS

Greig et al. "Exact Maximum A Psoteriori Estimation for Binary Images" JSTOR, Soc. B (1989), 51, No. 2, pp. 271-279.*

* cited by examiner

STATISTICAL PRIORS FOR COMBINATORIAL OPTIMIZATION: EFFICIENT SOLUTIONS VIA GRAPH CUTS

CROSS-REFERENCE TO RELATED APPLICATIONS

This application claims the benefit of U.S. Provisional Application No. 60/663,768, filed Mar. 21, 2005, which is incorporated herein by reference.

BACKGROUND OF THE INVENTION

In a 1948 paper, Shannon considered the formation of text as a stochastic process. He suggested to learn the probabilities governing this stochastic process by computing the histograms of occurrences and co-occurrences of letters from a sample text. Subsequently he validated the accuracy of the generated model by sampling new texts from the estimated stochastic model. The successive integration of higher order terms (occurrence of letter triplets rather than pairs etc.) provides for the emergence of increasingly familiar structures in the synthesized text.

In the context of images, similar approaches have been proposed in the Markov random field literature. Going back at least as far as Abend's work, K. Abend, T. Harley, and L. N. Kanal. Classification of binary random patterns. *IEEE Transactions on Information Theory*, 11:538-544, 1965, Markov random fields have endured a sustained interest in the vision community. Besag applied them in the context of binary image restoration. See, J. Besag. On the statistical analysis of dirty pictures. *J. Roy. Statist. Soc., Ser. B.*, 48(3):259-302, 1986. Derin analyzed texture in the context of a Markov random field using learned priors. See, H. Derin and H. Elliott. Modeling and segmentation of noisy and textured images using Gibbs random fields. *IEEE PAMI*, 9(1):39-55, January 1987. Work has continued through new applications such as texture segmentation or through extension of the basic model, for example by considering higher-order cliques. See, B. S. Manjunath and R. Chellappa. Unsupervised texture segmentation using Markov random field models. *IEEE PAMI*, 13(5):478482, May 1991 and W. Pieczynski, D. Benboudjema, and P. Lanchantin. Statistical image segmentation using triplet Markov fields. In S. B. Serpico, editor, *SPIE Int. Symposium on Image and Signal Processing for Remote Sensing VIII*, volume 4885, pages 92-101. SPIE, March 2003, respectively.

However, the major computational challenge arising in the application of Markov random fields lies in determining global optima of functions $$E:\{0,1\}^n \to R \qquad (1)$$

over a large set of binary-valued variables $\{x_1, \ldots, x_n\}$. The optimization of functions of binary-valued variables has a long tradition, going back to work of Ising on ferro-magnetism. See, E. Ising. Beitrag zur Theorie des Ferromagnetismus; *Zeitschrift für Physik*, 23:253-258, 1925. Numerous methods have been proposed to tackle these combinatorial optimization problems. Geman and Geman showed that the method of Simulated Annealing is guaranteed to find the global optimum of a given function. See, S. Geman and D. Geman. Stochastic relaxation, Gibbs distributions, and the Bayesian restoration of images. *IEEE PAMI*, 6(6):721-741, 1984, S. Kirkpatrick, C. D. Gelatt Jr., and M. P. Vecchi. Optimization by simulated annealing. *Science*, 220(4598): 671-680, 1983, and N. Metropolis, A. Rosenbluth, M. Rosenbluth, A. Teller, and E. Teller. Equation of state calculations by fast computing machines. *J. Chem. Physics*, 21:1087-1092, 1953. Unfortunately, general purpose optimization methods such as Simulated Annealing require exponential runtime and can be quite slow for the number of nodes considered in most realistic applications. In contrast, deterministic or approximation algorithms are not guaranteed to find a global optimum.

A key challenge addressed herein is to devise methods to efficiently impose statistically learned knowledge in such combinatorial optimization problems. New and improved optimization schemes to learn prior information while maintaining graph representability in image segmentation are required.

SUMMARY OF THE INVENTION

Within the framework of Bayesian inference learned priors can be applied into computer vision or image processing algorithms. The related combinatorial optimization problems in the image processing have commonly been handled inefficiently. It is one aspect of the present invention to provide efficient cost-function related graph cuts methods to restore a binary image corrupted by noise by imposing learned priors by Bayesian inference.

In accordance with one aspect of the present invention, a method of processing an image having a plurality of nodes is provided. The method includes processing the image by minimizing an energy function having a plurality of terms. Then, the method determines a first probability that the first node and the second node are similar and a second probability that the first node and the second node are different. If the first probability is greater than the second probability, then modifying at least one of the plurality of terms in the energy function, the one of the plurality of terms depending on values associated with a first and a second node in the plurality of nodes. The plurality of nodes can also be triplets. A condition for triplets is that the sum of the pairwise similarities of triplets has to exceed the sum of the pairwise differences between triplets The method of the present invention simplifies the processing step of minimizing the energy function. It results in reduced processing time.

In accordance with a further aspect of the present invention, the energy function is:

$$E(x_1, \ldots, x_n) = \sum_i \frac{-\lambda}{1+|I_i - x_i|} + \sum_{i<j} (\alpha^{11}_{(j-i)} x_i x_j + \qquad (12)$$
$$\alpha^{10}_{(j-i)} x_i (1-x_j) + \alpha^{01}_{(j-i)} (1-x_i) x_j + \alpha^{00}_{(j-i)} (1-x_i)(1-x_j)$$

wherein $\lambda$ is a free parameter imposing the strength (i.e., confidence) of the intensity values of the given image. i.e., lambda=0 means that the input image is ignored, and lambda=infinity means that the input image dominates the filtering, resulting in ignoring the learned structure;

I is the input image;

$\alpha$ is the learned co-occurrence, i.e., $\alpha_{11}$ is the probability that nodes $x_i=1$ and $x_j=1$; and x is the (binary)_intensity value of the output image (i.e., the quantity that we are solving for).

In accordance with another aspect of the present invention, the first probability is $P_{00}P_{11}$ wherein $P_{00}$ is a probability that the first node and the second node are both 0 and $P_{11}$ is a probability that the first node and the second node are both 1. The second probability is $P_{01}P_{10}$ wherein $P_{01}$ is a probability that the first node and the second node are 0 and 1, respectively, $P_{10}$ is a probability that the first node and the second node are 1 and 0, respectively. The step of comparing the first probability to the second probability is performed in accordance with $P_{00}P_{11} \geqq P_{01}P_{10}$.

The processing time is reduced if the first probability is greater than the second probability by dropping one or more of the α terms in the energy function. This reduces processing time.

In accordance with a further aspect of the present invention, a method of restoration of binary images corrupted by noise wherein a known statistical distribution of relations between a plurality of pixels in an uncorrupted image is applied is provided. The method includes selecting from the known statistical distributions that are graph representable, imposing the known graph representable distributions in Bayesian inference by method of graph cuts on the pixels of the corrupted image, and assigning the calculated labels resulting from the graph cuts to the restored binary image.

It is another aspect of the present invention to provide methods to use priors which may be learned while maintaining graph representability.

It is another aspect of the present invention to provide methods to learn and impose prior knowledge on the distribution of pairs and triplets of labels in the graph cuts.

It is another aspect of the present invention to provide methods for creating classes of priors of second and third order which can be learned and efficiently imposed in Bayesian inference by computing graph cuts.

It is another aspect of the present invention to provide methods of applying most relevant priors to improve runtime performance and reconstruction error of image restoration.

It is another aspect of the present invention to provide prior constraints for efficiently restoring noisy images within limited calculations.

It is another aspect of the present invention to define prior constraints as pixel neighborhoods.

It is another aspect of the present invention to provide a program storage device readable by machine, tangibly embodying a program of instructions executable by the machine to perform the learned priors based image restoration methods on images.

DESCRIPTION OF A PREFERRED EMBODIMENT

Figure 1:
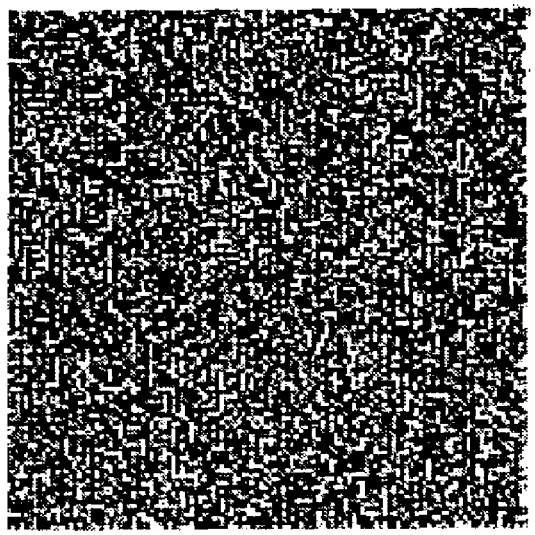
FIG. 1 shows an image of simple stripe patterns with 80% noise.

The present invention, in one aspect, relates to combinatorial optimization via graph cuts. The optimization of cost functions of the form (1) is in general an NP-hard combinatorial problem. The pioneering works of Picard and Ratliff and of Greig et al. showed that certain functions E of binary-valued variables can be represented by a directed graph G(v, ε) with nonnegative edge weights and two nodes s and t, called source and sink, such that the optimum of the function E corresponds to the minimal s-t-cut of the respective graph. See, for example, J. C. Picard and H. D. Ratliff. Minimum cuts and related problems. *Networks*, 5:357-370, 1975 and D. Greig, B. Porteous, and A. Seheult. Exact maximum a posteriori estimation for binary images. *J. Roy. Statist. Soc., Ser. B.*, 51(2):271-279, 1989. Due to the theorem of Ford and Fulkerson, the computation of the minimal cut is equivalent to computing the maximum flow from the source to the sink. See, L. Ford and D. Fulkerson. *Flows in Networks*. Princeton University Press, Princeton, N.J., 1962. Several algorithms exist to compute this flow in polynomial time. See, A. Goldberg and R. Tarjan. A new approach to the maximum flow problem. *Journal of the ACM*, 35(4):921-940, 1988, R. Ahuja, T. Magnanti, and J. Orlin. *Network Flows: Theory, Algorithms, and Applications*. Prentice Hall, 1993 and Y. Boykov and V. Kolmogorov. An experimental comparison of min-cut/max-flow algorithms for energy minimization in vision. *IEEE PAMI*, 26(9):1124-1137, September 2004. For an extension of graph cuts to non-binary cases, refer to Y. Boykov, O. Veksler, and R. Zabih. Fast approximate energy minimization via graph cuts. *IEEE PAMI*, 23(11):1222-1239, 2001. To restate, for certain Markov random fields, max-flow/min-cut algorithms provide both a fast and an exact solution to the optimization problem.

Recently, theoretical efforts have been made to determine exactly which classes of functions can be optimized by graph cuts. Ishikawa provided constructive results showing how graph cuts may be applied to optimize Markov random fields for convex expressions. See, H. Ishikawa. Exact optimization for Markov random fields with convex priors. *IEEE PAMI*, 25(10):1333-1336, October 2003. Kolmogorov and Zabih showed that a class of energies satisfying certain regularity constraints are graph representable, i.e. they can be efficiently minimized by computing the cut of an appropriate graph. See, V. Kolmogorov and R. Zabih. What energy functions can be minimized via graph cuts? *IEEE PAMI*, 24(5):657-673, 2002. However, they constructively demonstrated that graph cuts may be used to optimize a specific class of functions, the question of whether this class is exhaustive remains open.

The graph representability of statistical priors is a concern. This specification provides a framework for learning empirical distributions of labels from sample graphs, to impose these as statistical priors in the framework of Bayesian inference on graphs and to specify which kinds of priors are consistent with graph-representable energy terms. By restricting ourselves to graph-representable priors, the required optimization is simple, fast and exact.

The interpretation of the regularity constraints in the context of statistical learning allows us to specify, as another aspect of the present invention, a class of priors which can be learned from samples and efficiently imposed within the framework of Bayesian inference. As a specific application, we consider the problem of Bayesian restoration of binary images. In particular, we will show as another aspect of the present invention that one can impose previously learned information on correlation of the labels of pairs and triplets of vertices, as long as vertex labels are positively correlated. Numerical experiments on noisy images will demonstrate as another aspect of the present invention that fairly complex textural information can be learned, compactly represented and used for the efficient and optimal restoration from noisy images.

The outline of this specification is as follows. First, the two lines of work which form the backbone of the methodology of the present invention, namely the concept of Bayesian inference on graphs, and the regularity conditions introduced by Kolmogorov and Zabih will be discussed. As another aspect of the present invention a characterization will be presented of a class of translation-invariant statistical priors on vertex labels which can be learned from sample graphs and which can be efficiently imposed in Bayesian inference via graph cuts. Also, as another aspect of the present invention a measure of relevance of coupling terms which allows one to impose only the most relevant of learned priors is presented. Also numerical results on the restoration of binary images illuminating different aspects of the invention are provided. The restorations are highly accurate despite large amounts of noise. Optimal restorations of fairly complex textures in runtimes below one second and drastic speedup through the use of sparse priors, and methods of improved restoration by using higher-order priors are also introduced.

The theoretical background of the present invention is generally presented here. We start with Bayesian inference on graphs. Let $x=(x_1, \ldots, x_n) \in \{0,1\}^n$ be a vector of binary variables. Assume we are given a noisy version $I=(I_1, \ldots, I_n) \in R^n$ of this binary-valued vector. Then we can make use of the framework of Bayesian inference in order to reconstruct the vector x by maximizing the a posteriori probability $$P(x \mid I) = \frac{P(I \mid x)P(x)}{P(I)}. \tag{2}$$

The Bayesian reasoning has become increasingly popular in the computer vision community, mainly for two reasons. Firstly, the conditional probability $P(I|x)$ is often easier to model, it represents the likelihood of a certain observation I, given a state of the model x. Secondly, the Bayesian inference allows one to optimally integrate prior knowledge by the term $P(x)$, specifying which interpretations of the data are a priori more or less likely.

Herein, the specific case is considered wherein the measurements $I_i$ are mutually independent and that moreover they only depend on the value $u_i$ of the node i. Under these assumptions, the data term in (2) can be written as:

$$P(x \mid I) = \prod_i P(I_i \mid x_i). \tag{3}$$

Herein, we consider the data term:

$$P(I_i \mid x_i) \propto \exp\left(\frac{\lambda}{1 + |I_i - x_i|}\right). \tag{4}$$

Such discontinuity-preserving data terms are common in the PDE-based image restoration community [18]. Alternative choices are possible. Currently, we estimate λ manually by choosing appropriate values for this parameter. Automatic estimates of λ can also be provided.

A class of graph representable functions is discussed next. A further specification of a class of cost functions which can be optimized by graph cuts was recently given by Kolmogorov and Zabih. To this end, they consider two classes of cost functions denoted by $F^2$ (and $F^3$), representing functions which can be written as a sum of functions of up to two (or up to three) variables at a time. Specifically, the space $F^2$ contains functions of the form (1) which can be written as:

$$E(x_1, \ldots, x_n) = \sum_{i<j} E^{i,j}(x_i, x_j), \tag{5}$$

and similarly, $F^3$ contains all functions, such that:

$$E(x_1, \ldots, x_n) = \sum_{i<j<k} E^{i,j,k}(x_i, x_j, x_k). \tag{6}$$

In this way, one can consider nested classes of progressively more complex functions $F^1 \subset F^2 \subset \ldots \subset F_n$, where the latter class corresponds to the full class of binary-valued functions. Our definition of the spaces $F^n$ formally deviates from the one given in [15], in that we only consider sums of terms of exactly order n (and not terms of order up to n). While this simpler definition of $F^n$ will become useful in the context of learning priors from histograms, the following lemma shows that both definitions are equivalent and that spaces $F^1$, $F^2, \ldots, F^n$ are indeed nested (as stated above).

A useful lemma provides that: Any lower order function of binary variables can be expressed as sums of terms of higher order. As a proof: Let $\alpha x_1 + \beta(1-x_1)$ be an arbitrary first-order expression. Then obviously it can be written as a sum of second order terms:

$$\alpha x_1 + \beta(1-x_1) = \alpha x_1 x_2 + \alpha x_1(1-x_2) + \beta(1-x_1)x_2 + \beta(1-x_1)(1-x_2).$$

Generalization to higher orders follows by induction.

Kolmogorov and Zabih show that functions in $F^1$, $F^2$ and $F^3$ can be optimized in polynomial time with the graph cuts algorithm if they fulfill certain regularity constraints. Namely, all functions in $F^1$ are regular, while functions in $F^2$ and $F^3$ are regular if, for all terms $E^{i,j}(x_i, x_j)$ of two arguments $$E^{i,j}(0,0) + E^{i,j}(1,1) \leq E^{i,j}(0,1) + E^{i,j}(1,0), \tag{7}$$

and, for all terms $E_{i,j,k}(x_i, x_j, x_k)$ of three arguments, the same inequality must hold in the remaining two arguments once any of the three arguments is fixed.

The theorem of Kolmogorov and Zabih in [15] provides a sufficient condition under which energies in $F^2$ and $F^3$ can be optimized in polynomial time. It does not imply that regularity is a necessary condition, i.e. there may exist irregular functions which can be optimized in polynomial time.

Next, statistical priors for Bayesian inference are considered. In the context of restoration of binary images, researchers have successfully exploited generic priors $P(x)$ on the space of label configurations x—such as the one used in the well-known Ising model (see, E. Ising. Beitrag zur Theorie des Ferromagnetismus; *Zeitschrift fur Physik*, 23:253-258, 1925)—which favor neighboring nodes to have the same label. Such priors lead to smooth restorations and are well suited for the removal of noise. Yet they also lead to a blurring of (possibly relevant) small-scale structures. Moreover, given sample images of the structures of interest, one may ask whether it is possible to learn more appropriate object-specific priors P(x) and impose these within the framework of Bayesian inference.

The most general form of a prior distribution on the set of n variables can be written as:

$$P(x_1, \ldots, x_n) = \exp(-E(x_1, \ldots, x_n)), \quad (8)$$

with some function E.

Using the notation introduced earlier, we can consider subclasses of probability functions given by the spaces $F^k$ which take into account all correlations of exactly k nodes. We will refer to a prior (8) with an energy $E \in F^k$ as a prior of order k. In the following, we will focus on the spaces $F^2$ and $F^3$. Due to Lemma 1, the classes of higher-order priors always comprise the lower-order interactions.

Translation Invariant Priors on Cliques will now be discussed. For a second-order prior P, the energy E in (8) is of the form (5). Since we are dealing with binary-valued variables, then each term $E^{ij}$ in (5) is of the form $$E^{ij}(x_i, x_j) = \alpha_{11}{}^{ij} x_i x_j + \alpha_{10}{}^{ij} x_i (1-x_j) + \alpha_{01}{}^{ij} (1-x_i) x_j + \alpha_{00}{}^{ij} (1-x_i)(1-x_j), \quad (9)$$

with four parameters associated with each vertex pair. According to (8), we can relate these four parameters to the probability of co-occurrence of certain label values:

$$\alpha_{11}{}^{ij} = -\log(P(x_i=1 \cap x_j=1))$$

$$\alpha_{10}{}^{ij} = -\log(P(x_i=1 \cap x_j=0))$$

$$\alpha_{01}{}^{ij} = -\log(P(x_i=0 \cap x_j=1))$$

$$\alpha_{00}{}^{ij} = -\log(P(x_i=0 \cap x_j=0)) \quad (10)$$

In the case of a third-order prior on binary-valued variables, the energy E in (8) is given by (6), where each term $E^{i,j,k}$ takes on the form $$E^{ijk}(x_i, x_j, x_k) = \alpha_{ijk}{}^{111} x_i x_j x_k + \alpha_{ijk}{}^{110} x_i x_j (1-x_k) + \ldots$$

with eight parameters associated with each vertex triplet.

$$\alpha_{ijk}{}^{111} = -\log(P(x_i=1 \cap x_j=1 \cap x_k=1)),$$

$$\alpha_{ijk}{}^{110} = -\log(P(x_i=1 \cap x_j=1 \cap x_k=0)),$$

$$\ldots \quad (11)$$

The central idea of learning priors is to determine the parameters of the probabilistic model (8) from samples of labeled graphs. According to (11), the parameter $\alpha_{ijk}{}^{111}$, for example, corresponds to the negative logarithm of the relative frequency of label configuration (1, 1, 1) at the three nodes i, j and k.

Since in most relevant restoration algorithms one does not know the location of structures of interest, it is meaningful to focus on the subclass of translation-invariant priors, i.e. priors which treat all nodes identically. For priors of second order, the model parameters in expression (9) can only depend on the relative location of node i and node j. In other words $\alpha^{ij} = \alpha^{(j-i)}$ etc., where (j-i) denotes the vector connecting node i to node j. Given a training image, one can estimate the parameters $\alpha_{(j-i)}{}^{11}$, $\alpha_{(j-i)}{}^{01}$, $\alpha_{(j-i)}{}^{10}$, and $\alpha_{(j-i)}{}^{00}$ defining the translation-invariant prior distributions of second order, because the probabilities of co-occurrence of label pairs in equation (10) can be approximated by their histogram values. Similarly, in the case of third-order priors, the eight parameters $\alpha_{ijk}$ in (3.1) associated with each triplet of nodes only depend on the relative location of nodes i, j and k. These parameters can be estimated from joint histograms of triplets computed on a sample image.

A question that arises is which priors can be imposed efficiently? Along the lines sketched above, it is possible to learn arbitrary priors on the set of binary variables from the empirical histograms computed on sample images. Such statistical priors can be used in various ways. For example, as suggested by Shannon, one could generate synthetic label configurations (binary images if the nodes correspond to image pixels) by randomly sampling from the estimated distributions.

In the following, we will instead employ the empirically learned priors for the purpose of Bayesian restoration. We want to reconstruct a labeling $x = \{x_1, \ldots, x_n\} \in \{0,1\}^n$ of a graph given a noisy version $I = \{x_1, \ldots, x_n\} \in R^n$ of it and given the knowledge that the labeling is statistically similar to previously observed label configurations.

The optimal restoration is then given by the maximum a posteriori estimate in (2). Equivalently, we can minimize the negative logarithm of (2). With (3) and (4) and a translation-invariant prior of second order given in (5) and (9) this leads to an energy of the form:

$$E(x_1, \ldots, x_n) = \sum_i \frac{-\lambda}{1+|I_i-x_i|} + \sum_{i<j} (\alpha_{(j-i)}^{11} x_i x_j + \alpha_{(j-i)}^{10} x_i(1-x_j) + \alpha_{(j-i)}^{01}(1-x_i)x_j + \alpha_{(j-i)}^{00}(1-x_i)(1-x_j) \quad (12)$$

Similarly binary restoration with a translation-invariant prior of third order is done by minimizing an energy of the form:

$$E(x_1, \ldots, x_n) = \sum_i \frac{-\lambda}{1+|I_i-x_i|} + \sum_{i<j} (\alpha_{(j-i,k-i)}^{111} x_i x_j x_k + \alpha_{(j-i,k-i)}^{110} x_i x_j(1-x_k) + \ldots) \quad (13)$$

with eight terms imposing learned correlations of the label at node i with labels at nodes j and k. Due to the translation invariance, these correlations only depend on the relative locations of the nodes i, j and k: the parameters $\alpha_{ijk} = \alpha_{(j-i,k-i)}$ merely depend on the vectors from i to j and from i to k.

Minimizing energies of the forms (12) or (13) over the space of binary variables $x \in \{0,1\}^n$ is in general a hard combinatorial problem. An illustrative example of an NP-hard problem in the class $F^2$ is provided in V. Kolmogorov and R. Zabih. What energy functions can be minimized via graph cuts? *IEEE PAMI*, 24(5):657-673, 2002. In the context of images with relevant size, the number of nodes is on the order of $n=256^2$ or larger, therefore an exhaustive search or stochastic optimization methods such as simulated annealing are not well suited for this task.

While the graph cuts algorithm allows an efficient global optimization in polynomial time, it only applies to a certain class of energies. The regularity constraints as addressed before, however, allow us to make a precise statement about which priors can be efficiently imposed in the Bayesian restoration using graph cuts. Using the relation between energies and prior distributions given in (8), we can express the regularity constraint (7) on the level of probabilities:

$$-\log P_{00} - \log P_{11} \leq -\log P_{01} - \log P_{10}, \quad (14)$$

where $P_{00} = P(x_i=0 \cap x_j=0)$ stands for the probability that both labels are 0 etc. The above inequality is equivalent to:

$$P_{00}P_{11} \geq P_{01}P_{10} \quad (15)$$

If the joint probability of label values at nodes i and j fulfills the above inequality, then it can be efficiently imposed in the Bayesian restoration. In particular, this implies that for any two nodes which are positively correlated (i.e. $P_{00} \geq \max\{P_{01}, P_{10}\}$ and $P_{11} \geq \max\{P_{01}, P_{10}\}$), then one can impose their joint probability within the graph cuts framework. Beyond this one can also integrate priors stating that, for example, the label configuration (01) dominates all other configurations while the configuration (10) is sufficiently unlikely for inequality (15) to be fulfilled. On the other hand, joint priors modeling negative correlation, where opposite labels (01) and (10) dominate, are not consistent with inequality (15).

Similarly, the regularity constraints in [15] impose conditions for which the distributions of triplets can be imposed within the graph cuts optimization. Namely, the inequalities have to hold with respect to the remaining two arguments once any one of them is fixed, i.e. if $x_i=0$ is fixed then the inequality in nodes j and k states:

$$P_{000}P_{011} \geq P_{001}P_{010}, \quad (16)$$

$P_{000} = P(x_i=0 \cap x_j=0 \cap x_k=0)$ represents the joint occurrence of three labels of 0, etc. There are eight such constraints on the joint distribution of each triplet.

In accordance with one aspect of the present invention, the energy equation can be minimized by dropping $\alpha$ terms in accordance with the probability that two pixels have the same label (indicating they are both 0's or both 1's) as compared to the probability that the two pixels have different labels (indicating one pixel is a 0 and the other pixel is a 0). Thus, when the inequality in equation (15) is satisfied, the $\alpha$ terms corresponding to the probability that two pixels are different can be dropped from the energy equation, thereby saving processing time.

In practice, we compute the joint histograms (for pairs and triplets of node labels) from sample images and retain those priors which are consistent with the regularity constraints (15) or (16), respectively. The resulting cost function of the form (12) or (13) can then be efficiently optimized by the graph cuts algorithm. For details on how to convert these energy terms into respective edge weights of a graph, we refer to V. Kolmogorov and R. Zabih. What energy functions can be minimized via graph cuts? *IEEE PAMI*, 24(5):657-673, 2002.

One issue is selecting the most relevant constraints. The above framework allows to integrate into the graph cuts framework priors on the joint distribution of the label of a given node with labels of surrounding nodes for pairs and triplets of nodes. While the global optimum of the resulting restoration problem is guaranteed to be computable in polynomial time, experimental evidence shows that increasing the number of constraints (and thereby the number of edges in the graph) will typically increase the computation time: While the computation time for $n=256^2$ nodes with four constraints per node was on the order of 0.03 seconds, increasing the number of constraints per node to 716 lead to a computation time of more than one minute. While our experiments showed an increase in computation time with increasing number of constraints, one can find counter examples where the computation time is actually decreased by introducing additional edges.

A simple remedy to the problem of increasing computations is to only impose the most relevant constraints. In the following, we will give a heuristic measure for the relevance of a constraint. It is based on the following reasoning: The regularity constraint in (7) guarantees that the edges of the corresponding graph have non-negative weights [15]. Moreover, if the left side of inequality (7) is much smaller than the right side, then the respective edges will have very large positive weights, hence they will be very relevant to the computation of the minimal cut. Therefore, we can define the relevance of a coupling term (9) between nodes i and j by the measure:

$$\mathrm{rel}_{ij} = \alpha_{ij}^{10} + \alpha_{ij}^{01} - \alpha_{ij}^{11} - \alpha_{ij}^{00}. \quad (17)$$

In the context of priors of 3rd order, there are six regularity constraints associated with each node triplet. As a measure of the relevance of a given triplet of nodes i, j, and k, we simply compute the mean of the associated six relevance measures in (17). It is given by:

$$\mathrm{rel}_{ijk} = 1/6(\alpha_{ijk}^{001} + \alpha_{ijk}^{010} + \alpha_{ijk}^{100} + \alpha_{ijk}^{011} + \alpha_{ijk}^{101} + \alpha_{ijk}^{110} - 3\alpha_{ijk}^{111} - 3\alpha_{ijk}^{000}). \quad (18)$$

Qualitatively, both relevance measures state that the co-occurrence of identical label values should dominate the histogram for a prior to be relevant. There are clear advantages of retaining only the most relevant constraints, both regarding lower computation time and regarding smaller restoration error.

Experimental results will now be presented. In the following, we will present experimental results on the restoration of binary images which illuminate various aspects of our approach. Our implementation of graph cuts is based on code provided by Vladimir Kolmogorov [15].

Figure 2:
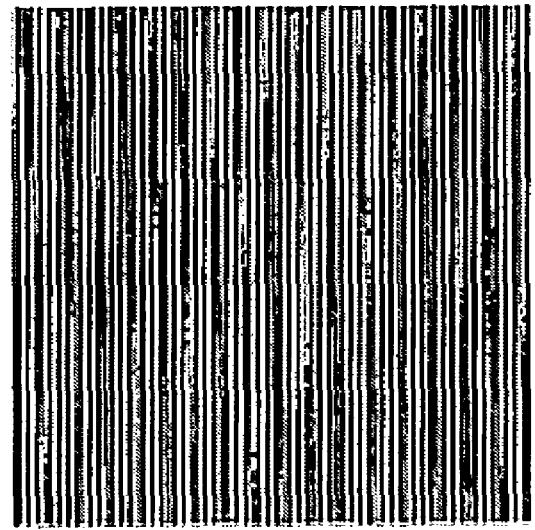
FIG. 2 shows the restoration of the image of FIG. 1 in accordance with an aspect of the present invention.
Figure 3:
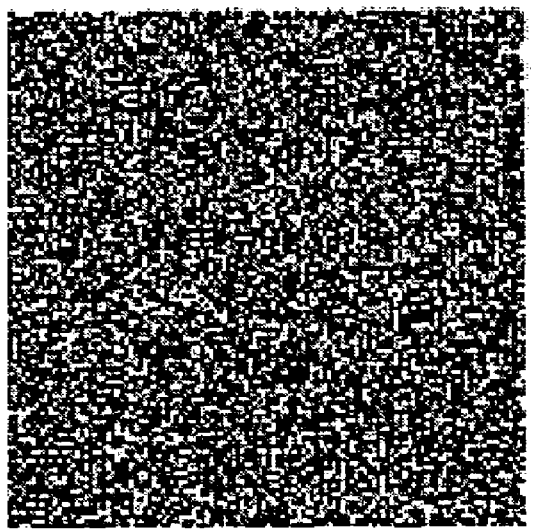
FIG. 3 shows an image of simple stripe patterns with 90% noise.
Figure 4:
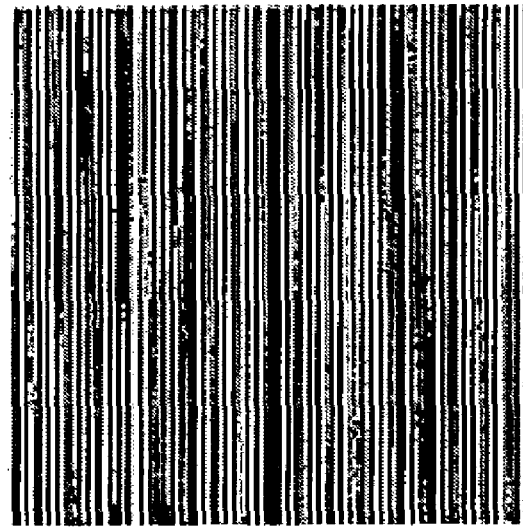
FIG. 4 shows the restoration of the image of FIG. 3 in accordance with an aspect of the present invention.

Fast restoration of simple patterns have been demonstrated with the present invention. Illustrative examples are provided in FIG. 1, FIG. 2, FIG. 3 and FIG. 4. Now referring to FIG. 1 and FIG. 3, they show a binary pattern of vertical stripes of width two pixels, corrupted by various amounts of salt and pepper noise. The amount of noise in FIG. 1 is 80%. In this 80% noise means that 80% of the pixels are replaced by a random value. The amount of noise in FIG. 3 is 90%. Now referring to FIG. 2 and FIG. 4. The images in FIG. 2 and FIG. 4 show respective restoration results (with $\lambda=1$) obtained using a second order prior coupling each pixel to the two nodes directly left and to the right. The image of FIG. 2 shows complete restoration with 0% error. The image of FIG. 4 shows restoration with 7% error. The priors estimated from empirical histograms of stripe patterns simply state that vertically neighboring pixels are very likely to be of the same color. There is no preference in the horizontal direction: since the stripes are two pixels wide, all pair combinations are equally likely. As a consequence, the restoration of the noisier version is suboptimal in that the vertical stripes in the restoration are no longer equidistantly spaced. The fast restoration of simple patterns is shown in FIG. 2 and FIG. 4. Optimal restorations of noisy stripe patterns using statistical priors learned from the joint histograms of a pixel with the neighbor above and the neighbor to the right, respectively. While the image of FIG. 2 was perfectly restored in 0.02 seconds from the image of FIG. 1, the image of FIG. 4 has a restoration error of 7% in 0.03 seconds (on a 200×200 image). The error restoration error percentage gives the percentage of incorrectly labeled pixels. Including couplings in larger neighborhoods improves the restoration.

Increasing the Neighborhood Size has also been considered. With increasing noise level, the Bayesian restoration requires increasingly sophisticated priors. The above prior on neighboring pairs of labels can be extended in two ways: by increasing the neighborhood size (which is considered here) and by generalizing to higher-order interactions (which will be considered later as an aspect of the present invention).

By increasing the neighborhood window in which priors are learned and imposed, the resulting prior is still of second order, but it integrates correlations of a given node with more distant nodes. In the case of the stripe pattern as used in FIG. 1, FIG. 2, FIG. 3 and FIG. 4, we learned the joint probabilities for a pixel and its neighbors in a 9×9 window. This provides coupling to 40 neighbors, 22 of which are regular. This prior allows to identify horizontal correlations. In the case of the stripe pattern in FIG. 1 with 90% noise, it provides a perfect restoration in 1.6 seconds for an image of size 200×200, with $\lambda=1.7$. Imposing pair priors on a neighborhood size of 9×9, we found that one can obtain perfect restorations of the stripe pattern in FIG. 2 even with 99% noise, i.e. even if only one in a hundred pixels provides reliable information about the location of the stripes.

Figure 5:
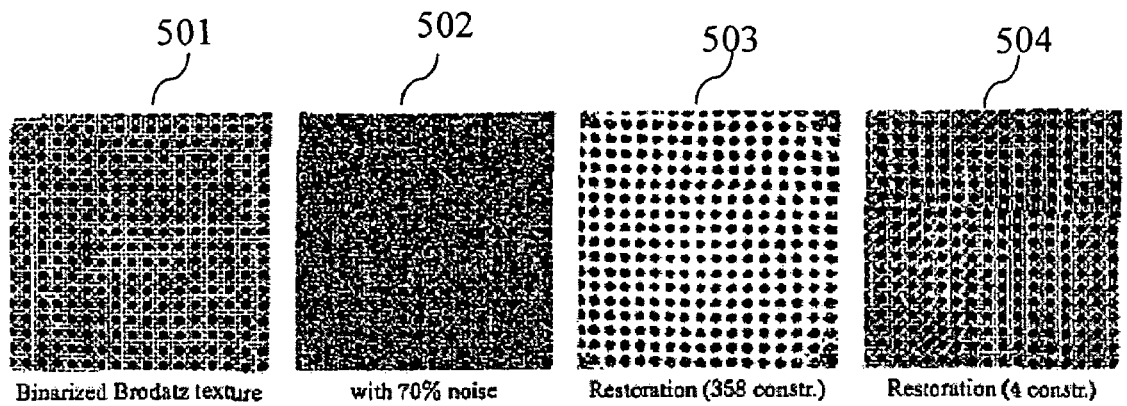
FIG. 5 is comprised of four images: a binarized Brodatz texture, the texture with 70% noise and two different restorations of the noisy image in accordance with different aspects of the present invention.

Sparse priors for increased efficiency are also possible. In order to reconstruct more complex patterns, it is necessary to consider joint distributions of labels in increasingly large neighborhoods. This will lead to an increasing number of edges in the respective graph, coupling each pixel to a larger and larger number of surrounding pixels. In order to keep the computation time low, one can restrict the algorithm to only impose the most relevant constraints. In following, we will employ the relevance measure defined before to select the most relevant couplings determined in a given neighborhood. FIG. 5 shows different images of a 256×256 pixels binarized Brodatz texture (201) and the same texture with 70% salt-and-pepper noise (202). On a sample texture image, we estimated the pairwise joint distributions for pixel couplings in a neighborhood of 35×35 pixels. Among these 612 possible neighbor nodes, 375 provided regular constraints fulfilling the inequality (15). Using all 375 constraints, the computation of the optimal restoration took 23.2 seconds, giving a restoration error of 23.6%. Using only the five most relevant constraints allowed an optimal restoration in 0.4 seconds. Surprisingly, the restoration error was only 20%. Respective restorations are shown in FIG. 5 images 203 and 204. Now referring to FIG. 5, image 501 is the original image; image 502 is the image of 501 with 70% of noise. Images 503 and 504 are restorations of the image 502. Image 503 is obtained by using all 375 regular constraints estimated an 35×35 neighborhood. Image 504 shows the restoration from 502 using only the 5 most relevant constraints.

Table 1 shows respective run-times, restoration errors and appropriate values of $\lambda$ for imposing varying numbers of relevant constraints which were selected by thresholding the relevance (17) computed for each node pair.

TABLE 1

| | # of cons | | | | | | |
|---|---|---|---|---|---|---|---|
| | 375 | 53 | 21 | 13 | 7 | 5 | 3 |
| CPU(s) | 23.2 | 2.92 | 1.45 | 0.86 | 0.47 | 0.40 | 0.33 |
| error(%) | 23.6 | 23.6 | 22.2 | 21.2 | 20.0 | 20.0 | 23.3 |
| $\lambda$ | 38 | 38 | 33 | 20 | 13 | 8 | 4 |

Table 1 demonstrates efficiency with sparse priors: Run time, restoration error and appropriate $\lambda$ values for decreasing number of constraints imposed in the restoration of the Brodatz texture as shown in FIG. 5. Using only the most relevant constraints leads to improvements both with respect to the run time and, surprisingly, with respect to the restoration error (up to a minimal set of constraints). The two as bold highlighted error values (23.6 and 20.0) are associated with the restorations in FIG. 5.

The table allows for several observations: Firstly, the computation time clearly decreases with fewer constraints used. Secondly, the restoration error actually decreases when using only the most relevant constraints (up to a certain minimal set of constraints). We believe that this property is due to the fact that less relevant constraints may impose spurious correlations, especially when computed from not perfectly periodic textures such as the Brodatz texture. Using the relevant constraints only will assure that the algorithm makes use of only those couplings that are persistent throughout the entire texture. Thirdly, appropriate values for the weight of the data term, $\lambda$, increase with the number of constraints used, because imposing more constraints gives more weight to the prior term. In all reported experiments, $\lambda$ was manually chosen to provide good restoration results. Beyond the observed relation between appropriate values of $\lambda$ and the number of imposed constraints, quantitative results regarding the optimal choice of $\lambda$ are still being investigated.

Figure 6:
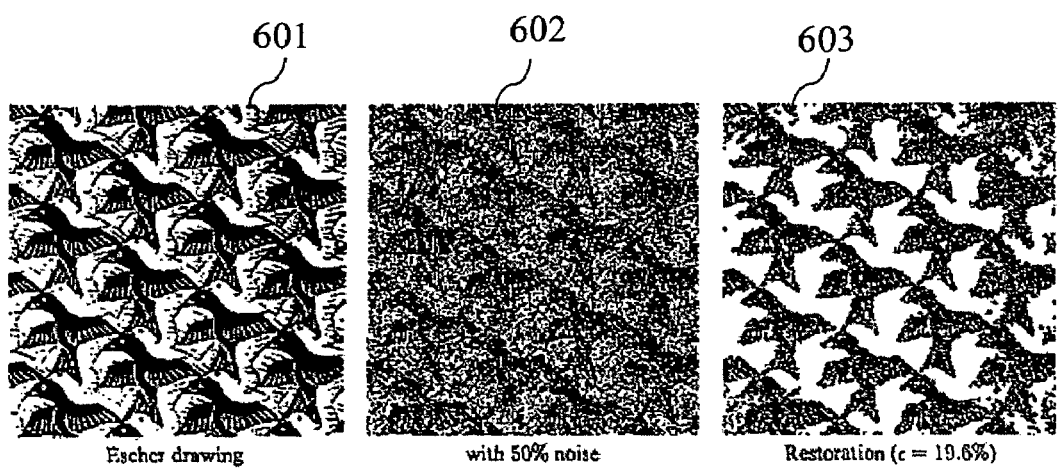
FIG. 6 is comprised of three images: an original image, the original image with 50% noise and the restoration of the noisy image in accordance with an aspect of the present invention.

The selection of relevant terms becomes more crucial when learning priors for larger-scale structures, as these require to consider larger neighborhoods. FIG. 6 shows the restoration of a noisy version of a drawing by M. C. Escher. Now referring to FIG. 6, the images of FIG. 6 601, 602 and 603 demonstrate the efficient integration of statistics on larger neighborhoods. Image 601 shows an error-free copy of the original drawing by M. C. Escher. Image 602 shows the image of 601 with 50% noise. Image 603 shows the restoration of image 602 using the 20 most relevant second order priors estimated in a 130×130 window (restoration error $\epsilon=19.6\%$). In contrast to generic smoothness priors, the statistically learned priors do not lead to a blurring of image structures.

Reconstruction with Third Order Priors is also contemplated in accordance with another aspect of the present invention. As suggested previously, one can learn and impose priors on the joint distribution of triplets of labels—provided that the regularity conditions (16) are fulfilled. In practice, the key difficulty about learning third-order priors is that the consideration of all possible node triplets is infeasible for graphs of meaningful size: For a graph of 256×256 nodes, there exist $$\binom{256^2}{3} \approx 5 \cdot 10^{13}$$

possible triplets. To consider all possible triplets within a certain neighborhood of each node (without counting some more often than others) turns out to be a challenging problem as well.

In order to count all triplets in a certain "vicinity" of a node, we revert to the following solution: For each node of the graph, we consider all triangles of a fixed maximal circumference $\delta$ (measured in the Manhattan distance) with one vertex at the node of interest. The parameter $\delta$ provides a measure of the "vicinity" analogous to the window size in the case of pairs.

Figure 7:
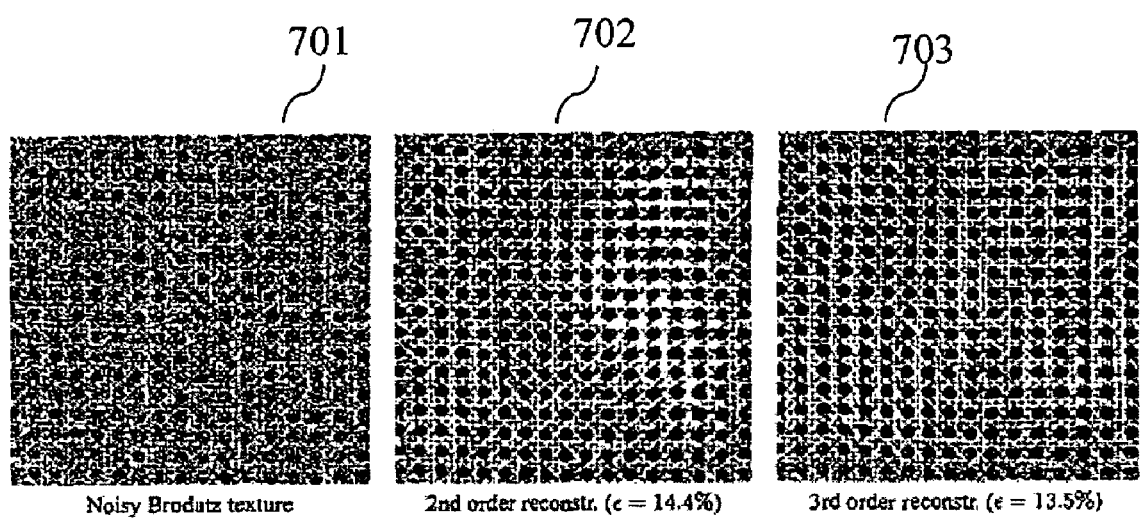
FIG. 7 is comprised of an original image with noise and two different restorations of the image in accordance with different aspects of the present invention.

FIG. 7 provides a comparison of restorations of a noisy Brodatz texture obtained with 2nd order and 3rd order priors, respectively. In both cases, we used a threshold $\theta=2.1$ on the respective relevance of pairs (or triplets) which provided eleven constraints for each node in the graph. Imposing constraints on the joint distribution of triplets (rather than pairs)

reduced the restoration error ϵ from 14.4% to 13.5%. Now referring to FIG. 7. FIG. 7 provides illustrative examples of image restoration using triplets versus pairs. Image 701 shows a noisy Brodatz texture with 50% salt-and-pepper noise. Image 702 and 703 show restored images; showing in 702 using priors of $2^{nd}$ and in 703 using priors of $3^{rd}$ order. Both priors include terms in a neighborhood of up to 15 pixel distance, using the eleven most relevant constraints (obtained by thresholding the relevance). We considered 215760 triplets per node, 7873 of which were regular. By including terms of higher order, the reconstruction error ϵ is reduced from 14.4% (computed in 0.5 seconds) to 13.5% (computed in 2.8 seconds). Making use of knowledge about joint probability of triplets (rather than pairs) provides additional regularity of the reconstructed pattern.

The present invention introduces statistically learned priors into an efficient method for Bayesian inference on graphs. Building up on regularity constraints proposed in the context of graph-representability of cost functions [15], a class of priors of second and third order is specified which can be learned and efficiently imposed by computing graph cuts. In particular, it was demonstrated that priors favoring labels to be similar are part of this class. It is believed that this is the first time that statistically learned priors of second and third order were introduced into an efficient combinatorial optimization algorithm. Experimental results demonstrate that the proposed method allows to compute optimal restorations of rather complex binary textures from images which are heavily corrupted by noise in runtimes in the order of seconds. In addition, we showed that enforcing only the most relevant priors leads to improvements regarding both runtime and reconstruction error.

Figure 8:
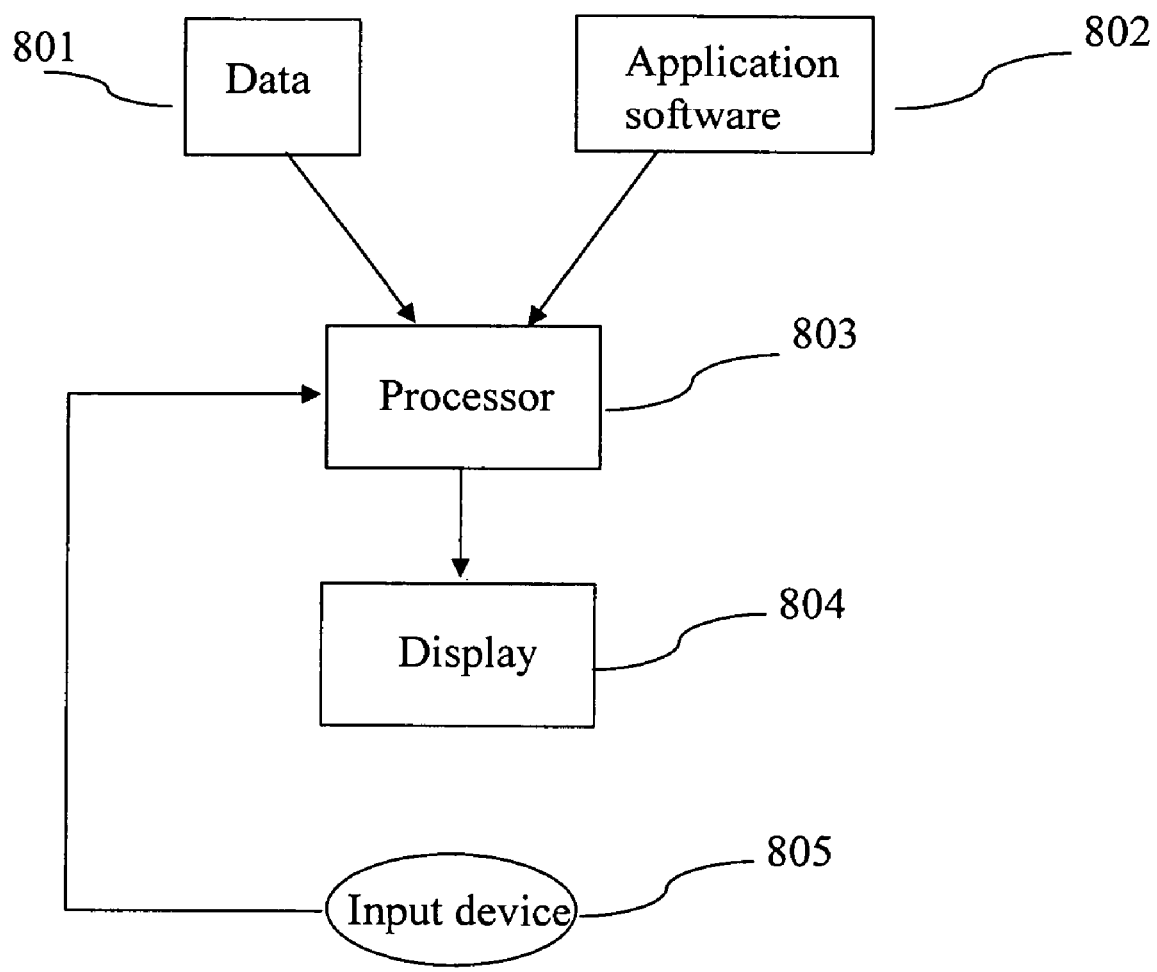
FIG. 8 is a diagram of a system that can perform the methods of the present invention.

The restoration methods that are part of the present invention can be executed by a system as shown in FIG. 8. The system is provided with data 801 representing the image. An instruction set or program 802 executing the methods of restoration using learned priors is provided and combined with the data in a processor 803, which can process the instructions of 802 applied to the data 801 and show the restored image on a display 804. An input device 805 like a mouse, or track-ball or other input device allows a user to select the initial object. Consequently the system as shown in FIG. 8 provides an interactive system for image restoration of a noisy image using statistical priors methods via graph cuts.

The following references describe the general level of art generally related to graph cuts, and each reference is hereby incorporated by reference: [1] K. Abend, T. Harley, and L. N. Kanal. Classification of binary random patterns. *IEEE Transactions on Information Theory*, 11:538-544, 1965; [2] R. Ahuja, T. Magnanti, and J. Orlin. *Network Flows: Theory, Algorithms, and Applications*. Prentice Hall, 1993; [3] A. Barbu and S.-C. Zhu. Graph partition by Swendsen-Wang cuts. In *ICCV*, pages 320-329, 2003; [4] J. Besag. On the statistical analysis of dirty pictures. *J. Roy. Statist. Soc., Ser. B.*, 48(3):259-302, 1986; [5] Y. Boykov and V. Kolmogorov. An experimental comparison of min-cut/max-flow algorithms for energy minimization in vision. *IEEE PAMI*, 26(9): 1124-1137, September 2004; [6] Y. Boykov, 0. Veksler, and R. Zabih. Fast approximate energy minimization via graph cuts. *IEEE PAMI*, 23(11):1222-1239, 2001; [7] H. Derin and H. Elliott. Modeling and segmentation of noisy and textured images using Gibbs random fields. *IEEE PAMI*, 9(1):39-55, January 1987; [8] L. Ford and D. Fulkerson. *Flows in Networks*. Princeton University Press, Princeton, N.J., 1962; [9] S. Geman and D. Geman. Stochastic relaxation, Gibbs distributions, and the Bayesian restoration of images. *IEEE PAMI*, 6(6):721-741, 1984; [10] A. Goldberg and R. Tarjan. A new approach to the maximum flow problem. *Journal of the ACM*, 35(4):921-940, 1988; [11] D. Greig, B. Porteous, and A. Seheult. Exact maximum a posteriori estimation for binary images. *J. Roy. Statist. Soc., Ser. B.*, 51(2):271-279, 1989; [12] H. Ishikawa. Exact optimization for Markov random fields with convex priors. *IEEE PAMI*, 25(10):1333-1336, October 2003; [13] E. Ising. Beitrag zur Theorie des Ferromagnetismus; *Zeitschrift fur Physik*, 23:253-258, 1925; [14] S. Kirkpatrick, C. D. Gelatt Jr., and M. P. Vecchi. Optimization by simulated annealing. *Science*, 220(4598):671-680, 1983; [15] V. Kolmogorov and R. Zabih. What energy functions can be minimized via graph cuts? *IEEE PAMI*, 24(5): 657-673, 2002; [16] B. S. Manjunath and R. Chellappa. Unsupervised texture segmentation using Markov random field models. *IEEE PAMI*, 13(5):478-482, May 1991; [17] N. Metropolis, A. Rosenbluth, M. Rosenbluth, A. Teller, and E. Teller. Equation of state calculations by fast computing machines. *J. Chem. Physics*, 21:1087-1092, 1953; [18] P. Perona and J. Malik. Scale-space and edge-detection. *IEEE PAMI*, 12(7):629-639, 1990; [19] J. C. Picard and H. D. Ratliff. Minimum cuts and related problems. *Networks*, 5:357-370, 1975; [20] W. Pieczynski, D. Benboudjema, and P. Lanchantin. Statistical image segmentation using triplet Markov fields. In S. B. Serpico, editor, *SPIE Int. Symposium on Image and Signal Processing for Remote Sensing VIII*, volume 4885, pages 92-101. SPIE, March 2003.

While there have been shown, described and pointed out fundamental novel features of the invention as applied to preferred embodiments thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

We claim:

1. The method of processing an image having a plurality of nodes comprising the steps of: processing the image by minimizing an energy function having a plurality of terms;
   determining a first probability that a first node and a second node are similar;
   determining a second probability that the first node and the second node are different;
   wherein, the first determination probability is greater than the second determination probability and;
   if the first probability is greater than the second probability, modifying at least one of the plurality of terms in the energy function, the one of the plurality of terms depending on values associated with the first node and the second node in the plurality of nodes.

2. The method of claim 1, wherein the processing step is simplified by reducing a plurality of statistically learned constraints to be implemented in the plurality of terms.

3. The method of claim 1, wherein the energy function is:

$$E(x_1, \ldots, x_n) = \sum_i \frac{-\lambda}{1 + |I_i + x_i|} + \qquad (12)$$
$$\sum_{i<j} (\alpha_{(j-i)}^{11} x_i x_j + \alpha_{(j-i)}^{10} x_i (1 - x_j) +$$
$$\alpha_{(j-i)}^{01} (1 - x_i) x_j + \alpha_{(j-i)}^{00} (1 - x_i)(1 - x_j))$$

wherein λ is a free parameter imposing the strength of the intensity values of the given Image;
I is an input image;

α is a learned co-occurrence;

x is an intensity value of an output image.

4. The claim of claim 3, wherein:
the first probability is $P_{00}P_{11}$ wherein $P_{00}$ is a probability that the first node and the second node are both 0 and $P_{11}$ is a probability that the first node and the second node are both 1;
the second probability is $P_{01}P_{10}$ wherein $P_{01}$ is a probability that the first node and the second node are 0 and 1, respectively, $P_{10}$ is a probability that the first node and the second node are 1 and 0, respectively; and
a step of comparing the first probability to the second probability is performed in accordance with $P_{00}P_{11} \geq P_{01}P_{10}$.

5. The claim of claim 3, wherein one or more of the learned co-occurrence terms in the energy function are dropped if the first probability is greater than the second probability.

6. A system for processing an image having a plurality of nodes comprising:
a computer;
application software on the computer stored on a computer readable storage medium, the application software applicable to:
process the image by minimizing an energy function having a plurality of terms;
determining a first probability that a first node and a second node are similar;
determining a second probability that the first node and the second node are different;
wherein, the first determination probability is greater than the second determination probability and;
if the first probability is greater than the second probability, modify at least one of the plurality of terms in the energy function, the one of the plurality of terms depending on values associated with the first node and the second node in the plurality of nodes.

7. The system of claim 6, wherein the processing of the image by minimizing the image by minimizing the energy function is simplified by reducing a plurality of constraints to be implemented in the plurality of terms.

8. The system of claim 6, wherein the energy function is:

$$E(x_1, \ldots, x_n) = \sum_i \frac{-\lambda}{1+|I_i - x_i|} \quad (12)$$
$$+ \sum_{i<j} (\alpha^{11}_{(j-i)}x_i x_j + \alpha^{10}_{(j-i)}x_i(1-x_j)$$
$$+ \alpha^{01}_{(j-i)}(1-x_i)x_j + \alpha^{00}_{(j-i)}(1-x_i)(1-x_j)$$

wherein $\lambda$ is a free parameter imposing the strength of the intensity values of the given image;
I is an input image;
α is a learned co-occurrence;
x is an intensity value of an output image.

9. The claim of claim 8, wherein:
the first probability is $P_{00}P_{11}$ wherein $P_{00}$ is a probability that the first node and the second node are both 0 and $P_{11}$ is a probability that the first node and the second node are both 1;
the second probability is $P_{01}P_{10}$ wherein $P_{01}$ is a probability that the first node and the second node are 0 and 1, respectively, $P_{10}$ is a probability that the first node and the second node are 1 and 0, respectively; and
comparing the first probability to the second probability is performed in accordance with $P_{00}P_{11} \geq P_{01}P_{10}$.

10. The claim of claim 8, wherein one or more of the learned co-occurrence terms in the energy function is dropped if the first probability is greater than the second probability.

11. A method of restoration of a corrupted image having a plurality of pixels corrupted by noise wherein a known statistical distribution in a plurality of known statistical distributions of relations between a plurality of pixels in an uncorrupted image is applied, comprising:
selecting the known statistical distribution from the plurality of known statistical distributions that is graph representable;
imposing the selected known graph representable statistical distribution in Bayesian inference by a method of graph cuts on the pixels of the corrupted image;
assigning calculated labels resulting from the graph cuts to a restored binary image.

12. The method as claimed in claim 11, wherein the known graph representable distributions are determined from a plurality of pairs of pixels in the uncorrupted image.

13. The method as claimed in claim 11, wherein the known graph representable distributions are determined from a plurality of triplets of pixels in the uncorrupted image.

14. The method as claimed in claim 11, wherein the known graph representable distributions are translation invariant.

15. The method as claimed in claim 11, wherein the known graph representable distributions are constrained by a measure of relevance of coupling terms between the plurality of pixels.

16. The method as claimed in claim 15, wherein the measure of relevance $rel_{ij}$ is determined by the relationship of pluralities of pairs of pixels i and j in the corrupted image and provided by the equation: $rel_{ij} = \alpha_{ij}^{10} + \alpha_{ij}^{01} - \alpha_{ij}^{11} - \alpha_{ij}^{00}$.

17. The method as claimed in claim 15, wherein the measure of relevance $rel_{ijk}$ is determined by the relationship of pluralities of triplets of pixels i, j and k in the corrupted image and provided by the equation:

$$rel_{ijk} = \frac{1}{6}(\alpha_{ijk}^{001} + \alpha_{ijk}^{010} + \alpha_{ijk}^{100} + \alpha_{ijk}^{011} + \alpha_{ijk}^{101} + \alpha_{ijk}^{110} - 3\alpha_{ijk}^{111} - 3\alpha_{ijk}^{000}).$$

18. The method as claimed in claim 15, wherein the measured relevance of the coupling terms between the pluralities of pixels of the corrupted image are in a constricted neighborhood of each other.

19. The method as claimed in claim 15, wherein the measured relevance of the coupling terms between the pluralities of pixels are pairs and the constricted neighborhood is a window of 35×35 pixels.

20. The method as claimed in claim 15, wherein the measured relevance of the coupling terms between the pluralities of pixels are triplets wherein a neighborhood of a first pixel of relevance is a triangle of a fixed maximal circumference measured in Manhattan distance with the first pixel as a vertex of the triangle.

* * * * *